Figure 5:
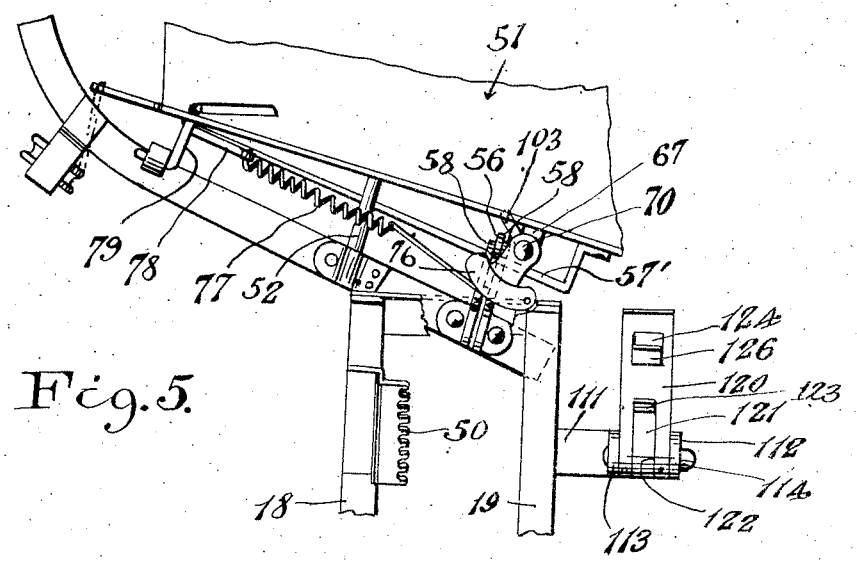

G. A. DURANT.
GRAIN SHOCKER.
APPLICATION FILED DEC. 6, 1915.
1,204,139.
Patented Nov. 7, 1916.
5 SHEETS—SHEET 1.
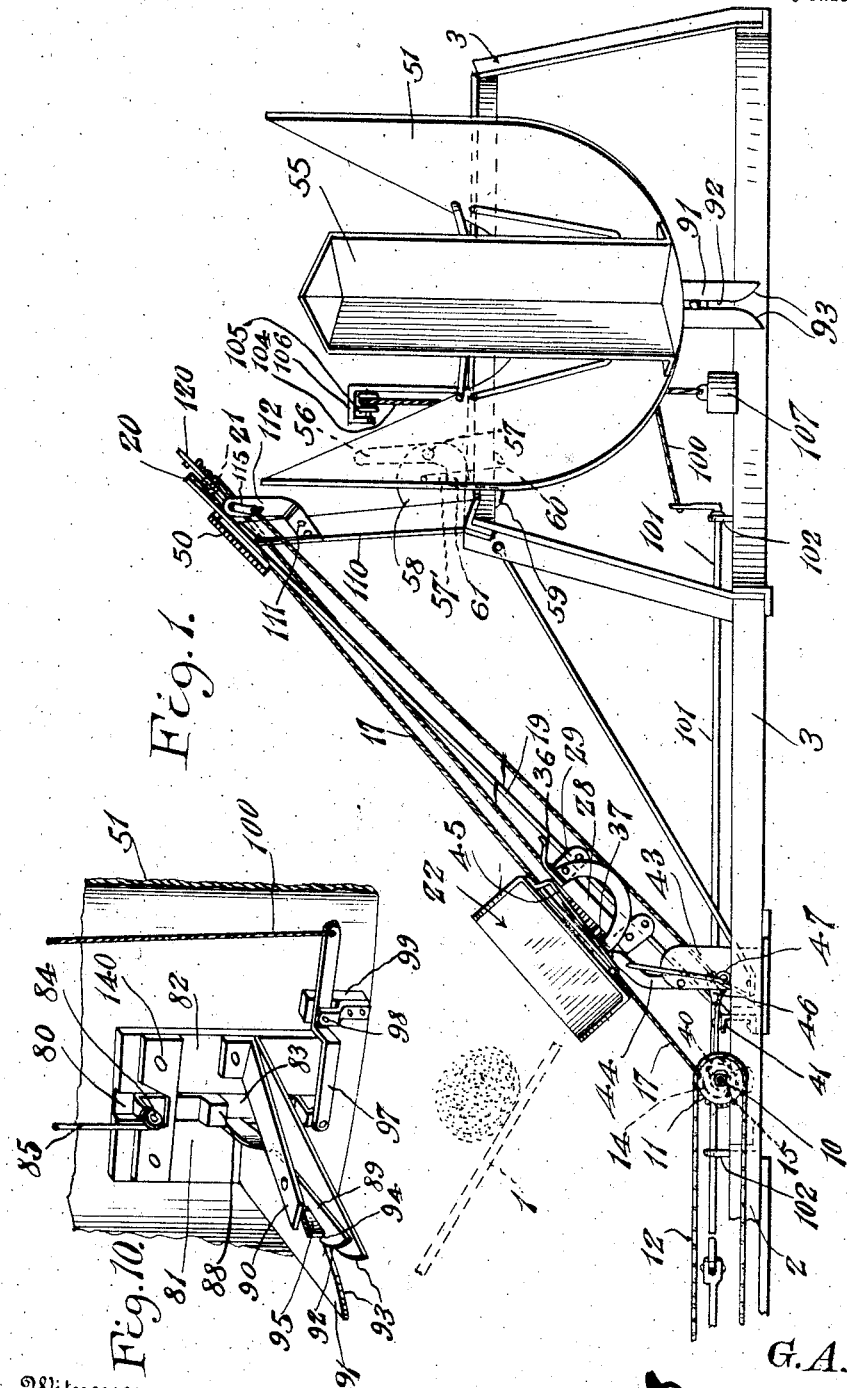
Witnesses
J. F. Wahler.
Rob. F. Meyer.
Inventor,
G. A. Durant,
Attorney

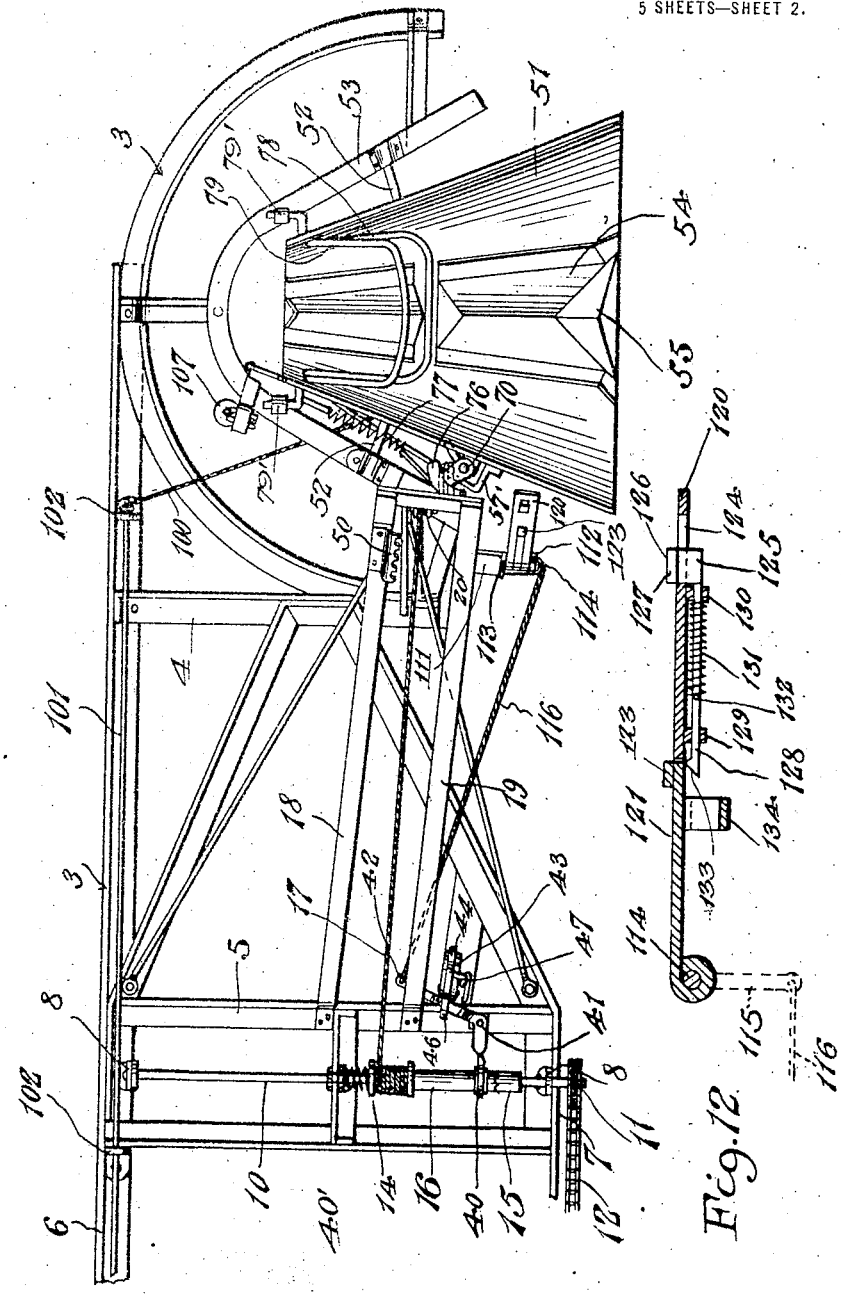

G. A. DURANT.
GRAIN SHOCKER.
APPLICATION FILED DEC. 6, 1915.
1,204,139.
Patented Nov. 7, 1916.
5 SHEETS—SHEET 3.
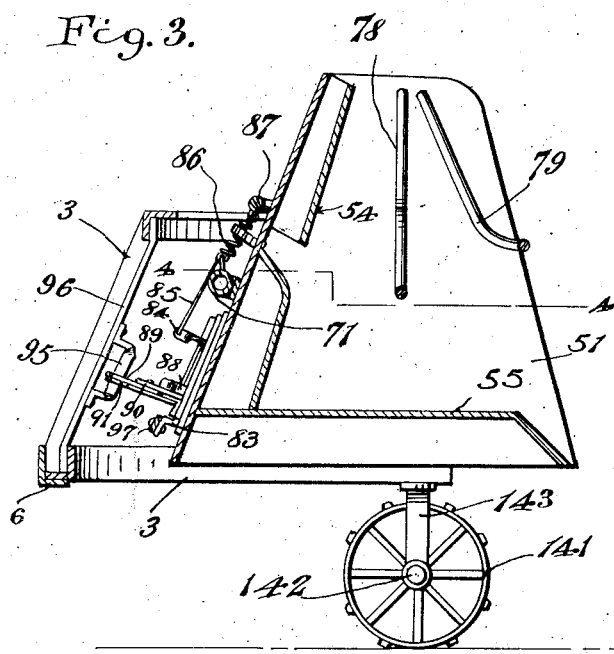
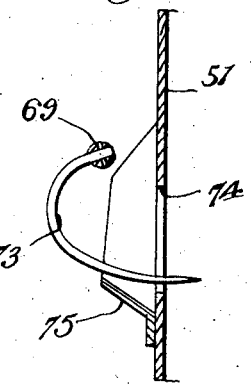
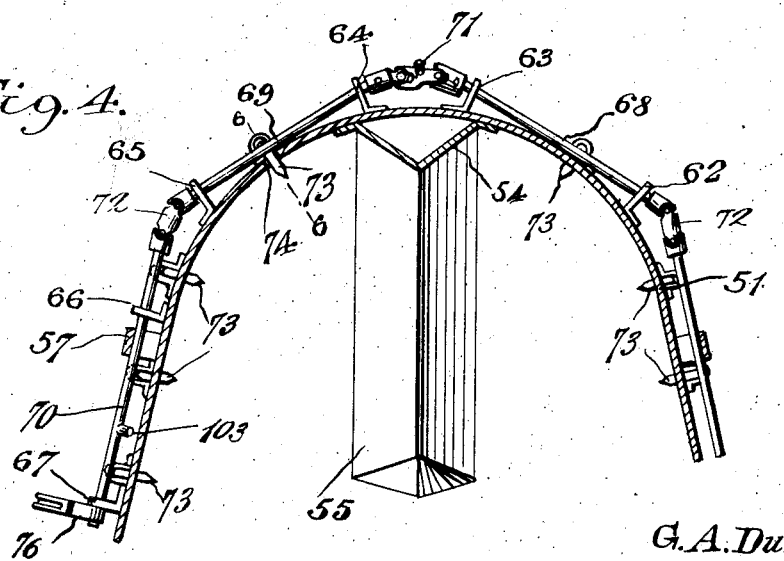
Inventor
G. A. Durant.

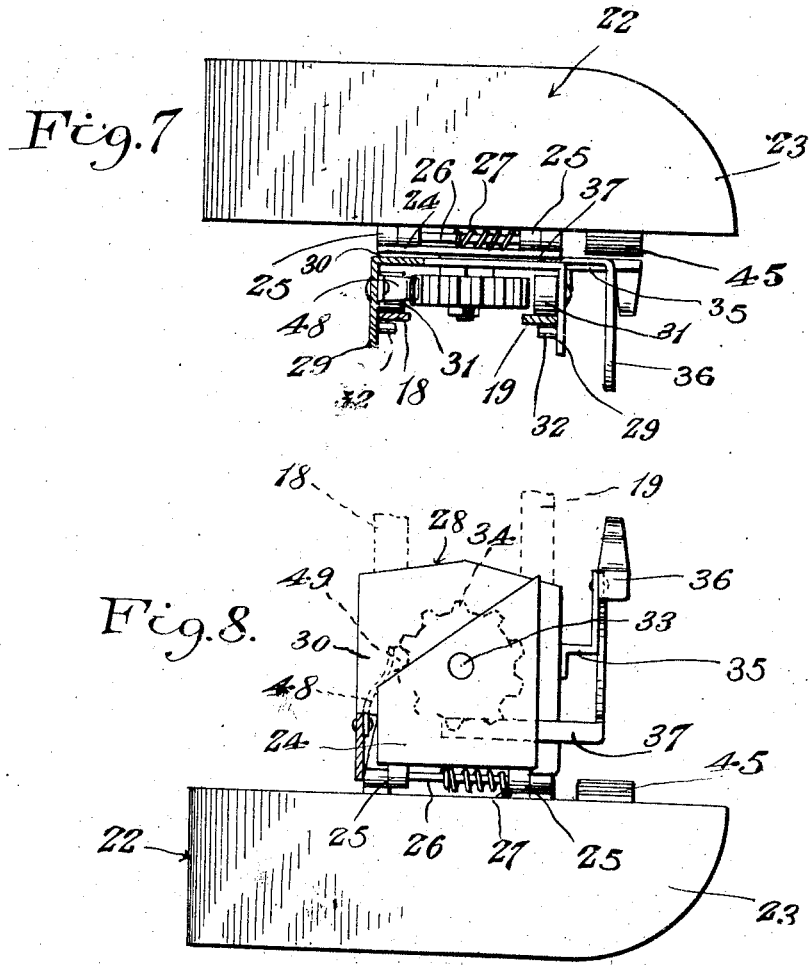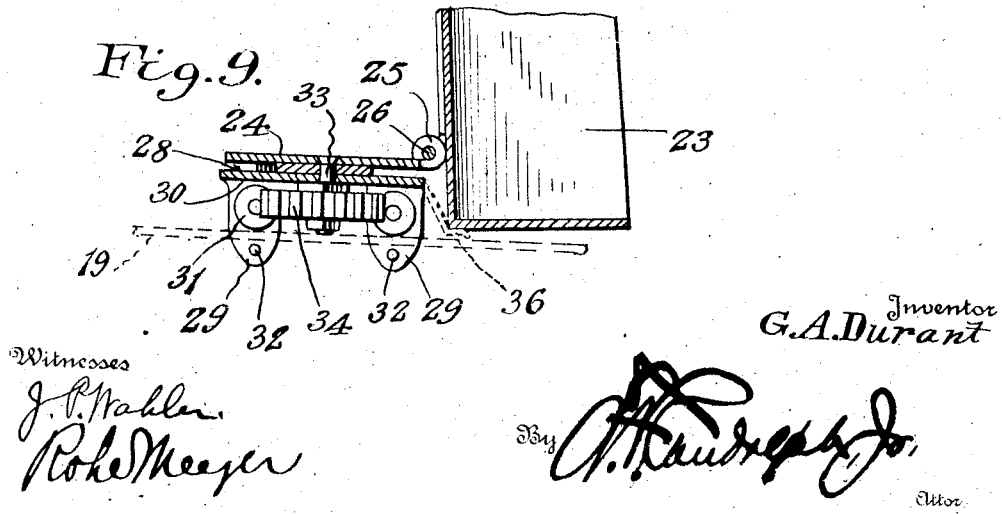

UNITED STATES PATENT OFFICE.

GEORGE A. DURANT, OF SWANSON, SASKATCHEWAN, CANADA.

GRAIN-SHOCKER.

1,204,139.  Specification of Letters Patent.  Patented Nov. 7, 1916.

Application filed December 6, 1915. Serial No. 65,394.

*To all whom it may concern:*

Be it known that I, GEORGE A. DURANT, a subject of the King of Great Britain, residing at Swanson, in the Province of Saskatchewan and Dominion of Canada, have invented certain new and useful Improvements in Grain-Shockers; and I do hereby declare the following to be a full, clear, and exact description of the invention, such as will enable others skilled in the art to which it appertains to make and use the same.

This invention relates to a device for shocking harvested grain, such as wheat, oats or the like, and the primary object of this invention is to provide a device adapted for attachment to a grain binder of any ordinary type, which will receive the sheaves thrown from the binder deck, collect them until the proper number is collected for forming a shock, and deposit them butts down in a shock in the field, and further to provide such a device which is controlled by the operator of the binder.

Another object of this invention is to provide a novel form of bundle or sheaf carrier, embodying a car for receiving the sheaves from a binder deck, which has operating means connected thereto, and controllable for movement into an operative position by the shocks or jar occasioned by the depositing of the sheaves within the car, for automatically moving the car along a guiding track to a position for emptying the sheaves therefrom into a sheaf retaining pan or receptacle, and further to provide means for automatically dumping the car for throwing the sheaves therefrom when it reaches the proper position for depositing the sheaves within the sheaf retaining and shock forming pan.

A still further object of this invention is to provide a novel form of mechanism for controlling the hingedly or pivotally supported shock forming pan, which is operated by the operator of the binder, for automatically releasing certain mechanism for permitting the pan to move into a horizontal position for depositing the bundles or sheaves therefrom in shocks upon the field over which the grain shocker is traveling.

Another object of this invention is to provide a shock forming pan which is provided with a plurality of compression members for engaging the shocks for properly holding them in position during the movement of the pan from a horizontal to a vertical position, and further to form a partition within the pan for properly spacing the bundles or sheaves.

From the foregoing and other objects in view this invention consists in such novel features of construction, combination and arrangement of parts as will be hereinafter more fully described, illustrated in the accompanying drawings and claimed.

Figure 13:
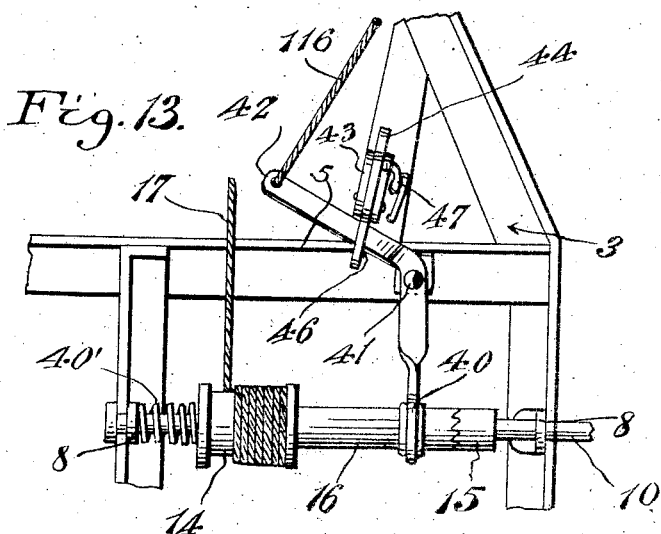
Figure 11:
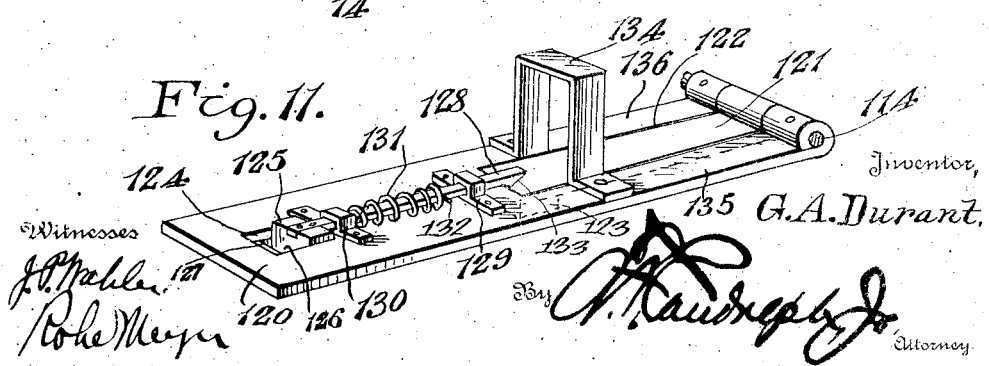

In describing the invention in detail reference will be had to the accompanying drawings wherein like characters designate like or corresponding parts throughout the several views, and in which:

Figure 1 is a side elevation of the improved shocking device, Fig. 2 is a top plan view of the improved shocking device, Fig. 3 is a fragmentary section of the shocking device, showing the shock forming pan in a vertical depositing position, Fig. 4 is a section through Fig. 3 on the line 4—4, Fig. 5 is an enlarged fragmentary plan view of the shocking device, showing the means for automatically dumping the sheaf carrying car and the mechanism for releasing the shock forming pan for movement into a vertical position, Fig. 6 is a section on the line 6—6 of Fig. 4, Fig. 7 is a side elevation of the sheaf carrying car, showing the operating mechanism carried by the bottom of the same, Fig. 8 is a plan view of the sheaf car operating mechanism, showing the car moved into a position for throwing a sheaf therefrom, Fig. 9 is a sectional view through Fig. 8, Fig. 10 is a perspective view of a part of the mechanism for controlling the movement of the shock forming pan, Fig. 11 is a detail perspective view of the mechanism for controlling the movement of the sheaf carrying car, Fig. 12 is a section through the mechanism for controlling the dumping of the sheaf carrying car, and Fig. 13 is an enlarged view of the sheaf car operating means.

Referring more particularly to the drawings, 1 designates the deck of any suitable type of grain binder, from which the bundles or sheaves are ejected after having been properly bound, and 2 designates a fragment of the binder frame, which has a supporting frame-work 3 of the bundle shocker connected thereto in any suitable manner. The frame 3 is constructed of angle iron and it has cross rails 4 and 5 secured to the side rails 6 and 7, a short distance outwardly from the binder frame 2. The side rails 6 and 7 have bearings 8 mounted thereon, intermediate the cross rails 4 and 5, in which bearings is rotatably seated a shaft 10. The shaft 10 is operatively connected to the operating mechanism of the binder, by means of a sprocket 11 mounted upon the shaft and a sprocket chain 12. The shaft 10 has a drum 14 loosely mounted thereon, the outer end of which drum has a clutch segment 15 mounted thereon, adapted for coaction with the clutch segment 16 which is feathered upon the shaft 10. The drum 14 has a cable 17 wound thereon, which extends upwardly substantially intermediate of the car carrying rails 18 and 19, and passes over a pulley 20, mounted upon a shaft 21 carried by the upper ends of the rails 18 and 19. The cable 17 extends downwardly from the pulley 20 and is connected to the sheave carrying car 22.

The sheave carrying car structure 22 embodies a hopper 23, which is hingedly connected to a plate 24, as is shown at 25, by means of a rod or hinge pin 26. The hinge pin 26 has a spiral spring 27 coiled about the same, one end of which spring engages the bottom of the hopper 23, and the other end engages the upper surface of the plate 24. The spring 27 is provided for automatically moving the hopper 23 into a horizontal position and upon the upper surface of the plate 24, as is shown in Fig. 7 of the drawings for positioning the hopper for receiving sheaves or bundles of grain therein.

The plate 24 is pivotally mounted upon a car truck 28, which is provided with depending ears 29, extending downwardly from the platform 30 thereof, which is rotatably supported by wheels 31, for travel upon the rails 18 and 19. Guard ears 32 are secured to the ears 29 and extend inwardly therefrom, for positioning upon the under surface of the rails 18 and 19 for preventing the car from jumping the rails during its travel thereover. The plate 24 has a stub shaft 33 formed thereon and extending downwardly from the central portion thereof, which shaft is rotatably carried by the platform 30, and has a gear 34 mounted thereupon, beneath the platform 30 of the truck structure 28, the purpose of which gear will be hereinafter more fully described.

The car truck 1 has a supporting bracket 35 secured to one side thereof, which extends outwardly from the car truck structure and has a trip lever 36 pivotally connected thereto, which trip lever has an angled arm 37 formed thereupon, which extends across the truck structure 28 above the plate 24, and beneath the bottom of the hopper 23, engaging the bottom of the hopper for tilting the hopper into the position indicated in Fig. 9 of the drawings, for dumping a sheave or bundle of grain therefrom, when the car reaches the upper end of the track which is composed of the rails 18 and 19.

The segment 16 has a forked actuating arm 40 connected thereto which is pivotally connected at 41 to the cross rail 5, and extends rearwardly therefrom having its rear end 42 positioned in a horizontal plane and extending rearwardly from the cross rail 5, beneath the rail 19. A standard 43 is secured to the frame 3 and extends upwardly therefrom pivotally supporting a lever 44, the upper end of which is positioned for engagement by a plate 45 positioned on the under surface of the bottom of the hopper 23, which plate is positioned at an incline for riding over the lever 44 and forcing it downwardly. The lever 44 has a catch 46 formed upon its lower end, which is provided for engaging the arm 42 for holding the arm against movement for holding the clutch segment 16 out of meshing engagement with the clutch segment 15 and consequently arresting rotation of the drum 14. A spring 47 is connected to the lever 44 and the standard 43 for holding the catch 46 in engagement with the arm 42, and it moves the lever 44 to its normal position for moving the catch into engagement with the arm 42 upon the release of pressure from the upper end of the lever by the upward movement of the car structure 22.

The car structure 28 has a spring arm 48 secured thereto which has a brake tooth 49 mounted upon its outer end for meshing engagement with the gear 34 for arresting movement of the gear during the upward travel of the car structure 22.

A rack bar 50 is mounted upon the rail 18 adjacent to its upper end and is provided for meshing engagement with the gear 34 when the latter reaches the rack, for rotating the hopper 23, for positioning it so that the bundles or sheaves will be properly deposited in the shock forming or sheave carrying pan 51. The shock forming or sheave carrying pan 51 is pivotally supported, by means of rods 52 extending transversely therefrom, to a substantially V-shaped section 53 of the frame 3 of the shocking machine. The sheave carrying pan 51 is preferably constructed of sheet metal and semi-frusto-conical in shape, having one side thereof open for receiving the sheaves or bundles therein when deposited from the hopper 23. A pan 51 is provided with a spider 54 which is substantially triangular shaped in cross section and extends downwardly along the center of the inner wall of the pan, and outwardly across the enlarged or base end of the same as is clearly shown in Fig. 3 of the drawings. The spider 54 is provided for properly spacing the bundles or sheaves of grain for forming a shock prior to the depositing of the shock upon the ground. The spider 54 is constructed of sheet metal and secured to the inner surface of the pan 51 in any suitable manner, such as by rivets or the like.

The pan 51 is normally held in a horizontal position, by an angled lever 56 which engages the upper surface of the bar 57' which is secured to and spaced outwardly from the outer surface of the sides of the pan 51 facing the binder. The lever 56 is pivotally connected at 57 to the supporting plate 58, which is carried by the frame 3 of the binder, and has depending plates or arms 59 and 60, between which the bar 57' is seated. The lower angled end 61 of the lever 56 is heavier than the upper actuating end of the same, so that it will move of its own accord beneath the bar 57', and hold the bar securely in place between the depending arms 59 and 60, for supporting the pan 51 in a horizontal position for receiving the bundles or sheaves from the structure 22.

The pan 51 has bearings 62, 63, 64, 65, 66 and 67 secured to the outer surface thereof, in which bearings are rotatably seated tumbling rods 68, 69 and 70. The rods 68 and 69 are connected by means of a universal joint indicated at 71, for synchronous rocking or rotation movement, and the rods 69 and 70 are also connected by means of a universal joint 72, for synchronous rocking movement. The tumbling rods 68 and 69 have sheave engaging prongs 73 secured thereto, which extend through openings 74 formed in the pan 51, and are guided in their movement by means of outstanding guides 75, which are constructed of sheet metal and positioned upon the opposite sides of the openings 74.

The rod 70 has a cam 76 mounted upon its outer end, which has one end of a wire 77 connected thereto. The wire 77 is coiled intermediate its ends for forming a spring, or resilient connection and the end of the wire which is free from connection to the cam 76 is connected to a compression rod 79, which is positioned within the pan 51 for bearing against the tops of the sheaves or bundles of grain for holding them in proper position during the movement of the pan 51 from a horizontal to a vertical position, prior to the depositing of the bundles in shocks, upon the ground in a field. The compression rod 79 is rockably carried by the pan 51, so that upon rocking movement of the shaft 70, it will be moved into a firm clamping position upon the tops of the bundles or sheaves of the grain.

A plate 80 is secured to the back of the outer surface of the pan 51 and it has plates 81 and 82 secured thereto in spaced relation for forming a guide way for a slidable bar 83, which has its upper end bent transversely to the main body portion as indicated at 84. The angled end 84 of the arm 83 is connected to the central link of the universal joint 71 by means of a rod 85 for rocking the various tumbling rods upon downward movement of the arm 83. A contracting spiral spring 86 is also connected to the central link of the universal joint 71 and to a rod 87, which is secured to the pan 51 in any suitable manner. The spring 86 tends to hold the tumbling rods 68, 69 and 70 positioned so that the prongs 73 will be positioned exteriorly of the interior of the pan 51.

The arm or plate 82 has a transversely extending lug 88 formed thereon substantially equidistant of its ends, which lug is provided for engagement by a pivoted catch or lug arm 89. The arm 89 is pivotally connected intermediate its ends to a bracket 90, which is secured to and extends outwardly from the plate 82. A plate 91 is secured to the plates 81 and 82 and has its outer end slit, as is shown at 92. The sections of the plate 91 upon the opposite sides of the slit or opening 92, have the inner edges at their outer ends curved outwardly, for forming arcuate approaches to the slot 92, as is clearly shown at 93. The outer end of the catch lever 89 has a head 94 formed thereupon which is positioned for movement over the slot 92, for engagement with a bar 95, which is carried by a standard 96 at the rear end of the frame 3. The lower end of the plate or arm 82 is pivotally connected to a lever 97, which lever is in turn pivotally connected at 98 to a block 99. The end of the lever 97, which is free from pivotal connection to the arm 83, has a flexible cord 100 secured thereto, which extends upwardly from the lever, over the rod 87, and is connected to a rod 101. The rod 101 is slidably carried for longitudinal sliding movement by bearings 102, carried by the side rails 6 of the frame 3, and it extends to a position for convenient access by the person operating the binder and the shocking attachment.

The tumbling rod 70 has a transversely extending pin 103 carried thereby, which is provided for engaging the actuating end of the catch lever 56, upon the rocking of the tumbling rod 70, in the manner which will be hereinafter more fully described.

A flexible member or cable 104 is secured to the apex of the pan 51, and passes over a groove pulley 105. The groove pulley 105 is rotatably supported by a bracket 106, which is carried by the frame 3, at the bearing of the frame. The flexible member 104 has a balancing weight 107 secured to its ends, for automatically returning the pan 51 to a horizontal position, after the shock of sheaves has been removed therefrom.

A supporting structure 110 for the upper ends of the rails 18 and 19 has a forked arm 111 secured thereto, and extending upwardly and forwardly therefrom. The upper forked ends 112 and 113 of the arm 111 are provided with bearing openings in which is rockably mounted a crank shaft or pin 114, the crank end 115 of which has a rod 116 connected thereto, which extends downwardly and outwardly therefrom, being connected to the end of the arms 42 of the lever clutch actuating arm 40. The shaft 114 has plates 120 and 121 mounted thereon. The plate 120 is split as is shown at 122, to provide a space in which the plate 121 is seated. The plate 121 has a stop block 123 secured to its outer end, which provides a trip block for engagement with the lever 36 for dumping the hopper 23.

The plate 120 is provided with a substantially rectangular shaped opening 124 formed in its outer end, through which extends the lower reduced section 125 of a stop or trip block 126. The stop or trip block 126 is provided with shoulders 127, which ride upon the upper surface of the plate 120, for properly guiding the movement of the block, and preventing it from falling through the opening 124. The reduced section 125 of the block 126 has a bar 128 connected thereto, which bar is slidably seated in guideways 129 and 130, carried by the under surface of the plate 120, and it has a spiral spring 131 coiled about the same, one end of which spring engages the guideway 130. The end of the spring which is free from engagement with the guideway 130, rests against the transversely extending pin 132, which is carried by the bar 128. The free end of the bar 128 is beveled, as is shown at 133, and it projects a short distance beyond the transverse edge of the opening 122, and engages the under surface of the plate 121, for holding the plates in their proper positions, prior to the movement of the block 126, which movement is occasioned by the engagement with the block of the lever 36. The movement of the block 126 is limited by the side of the opening 124, for properly tipping or dumping the hopper 28, for throwing the bundles or sheaves therefrom into the pan 51. A strap 134 is secured to the arms 135 and 136, which are formed by cutting away the plate 120 to form the opening 122. The movement of the plate or arm 83 is guided by a metallic strap 140, which is secured to the outer surface of the plates 81 and 82.

The outer end of the frame 3 has a supporting wheel 141 carried thereby, which is rotatably mounted upon a stub axle 142, carried by suitable bearings 143 which are secured to and extend downwardly from the outer end of the frame 3. The wheel 141 is similar in construction to the ordinary type of grain wheel of a binder or similar harvesting machine.

In the operation of the improved shocker: the sheaves or bundles of grain pass downwardly from the deck 1 of the binder and fall into the hopper 23. The force of contact or the shock occasioned by the bundle falling into the hopper 23, will move the lever 44 upon its pivotal connection, releasing the lever 40, and permitting the spring 40' to move the feathered clutch segment 16 into engagement with the clutch segment 15, which imparts rotation to the drum 14, and winds the cable 17 thereon, drawing the car structure 22 upwardly over the rails 18 and 19. When the car structure 22 approaches the upper ends of the rails 18 and 19, the gear 34 meshes with the rack teeth formed upon the rack bar 50, and rotates the hopper 23, for, positioning it so that the butts of the sheaves of grain will be positioned for depositing in the larger section of the pan 51. The spring arm 48 is tensioned so as to permit of the rotation of the gear 34, and consequently the stub shaft 33 and the hopper 23, upon the meshing engagement of the gear 34 with the rack bar, and to prevent the accidental rotation of the car during its upper passage over the rails. After the car has been properly turned, the arm 36 will engage the stop block 123, which is positioned in the path of the arm, and move this arm 36 upon its pivotal connection for forcing the hopper 23 into a vertical position, as indicated in Fig. 9 of the drawings, for dumping the sheave of grain therefrom and into the pan 51. The stop 123 will cause the sheave to be dropped in the near side of the pan. The upward movement of the car structure 22 and the force of the arm 36 against the stop 123 will force the plate 121 downwardly over the beveled end 133 and the bar 128 and the plate 121 striking the strap 134 will move or rock the plate 120 which will rock the shaft 114 and move the arm 42 with the clutch actuating forked arm 40 rearwardly, which will move the clutch, against the action of the spring 40', out of meshing engagement with the clutch segment 15, thereby stopping the rotation of the drum 14 by the rotation of the shaft 10. The spring 47 will move the arm 44, so that the catch 46 formed thereupon will engage the arm 42 and hold it against accidental movement until the arm 44 is again operated by the contact of a sheave falling into the hopper 23. The bar 128 will hold the plate 121 in its fallen position with relation to the plate 120, so that upon the second upward trip of the car structure the arm 36 will pass over the stop block 123 and engage the stop block 126 which will move the arm 36 upon its pivotal connection and move the hopper 23 into a vertical dumping position, thereby permitting the car to travel a short distance farther along the track before dumping than it travels upon the first trip, which will dump the sheave in the far side of the pan. The plate 120 is moved downwardly by the arm 36, and the clutch will be operated in the same manner as that performed when the arm operates the plate 121. When the plate 120 is forced downwardly, the bar 128 will engage the plate 121. When the plate 120 is moved upward by the rocking of the shaft 114 upon operation of the clutch arm 42, the plate 121 will move upward therewith and be positioned for tripping the lever 36 upon the third trip of the car structure; thus upon each alternate trip of the car structure, the sheave will be deposited in the far side of the pan. The weight of the car construction 22 will cause it to move downwardly along the rails 18 and 19, to a bundle receiving position, and unwind the cable from the drum 14 which is loosely mounted upon the shaft 10, and reposition the various mechanisms for reoperation upon the deposit of a sheave into the hopper 23. The inclined position of the plate 45, will permit the car to move downwardly and ride over the lever 44 without actuating the same.

Upon the second trip upwardly of the car structure 22, it will, owing to the fact that the plate 121 has been moved downwardly, by its first upward movement, pass beyond the stop block 123, and engage the stop block 126, which will permit the car structure to move a greater distance toward the upper ends of the rails 18 and 19, for depositing the bundle out of the hopper 23 upon the far side of the divider 54, which is mounted within the pan 51. The operation of the crank arm 114, by the readjustment of the lever 40, will move the plates 120 and 121 upwardly to their normal positions, for reoperation upon the various other trips of the car upwardly over the rails, causing the car to alternately deposit the sheaves upon the near and far sides of the divider 54, for properly positioning the sheaves for forming a shock within the pan 51.

When the desired number of sheaves have been deposited within the pan 51, for forming a shock, the rod 101 is moved longitudinally, which will operate the lever 97 upon its pivotal point, and move the plate 83 downwardly within its guideway. The downward movement of the plate 83, will rock the tumbler rods 68, 69 and 70. The rocking of the tumbler rods 68, and 69, will force the prongs or tines 73 inwardly into the shocks, for preventing the shocks from falling out of the pan during the movement of the pan from a horizontal to a vertical position. The rocking of the tumbler rod 70, will cause the pin 103 to engage the actuating or operating end of the lever 56, and move this lever upon its pivotal point 57, for moving it out from beneath the bar 57'. The rotation or rocking of the tumbler rod 70 will also rock the cam 76, which will force the compression members 78 and 79 into firm engagement with the tops of the sheaves, holding the tops in engagement with each other, for proper formation of a shock. The butts of the sheaves, being of greater weight than the heads, will rock the pan 51 upon its pivotal connection with the frame 3, and cause it to move into a vertical position. When the pan 51 reaches a vertical position, the plate 95 will move between the forked ends of the plate 91 and into the slot 92, where it will be held in place by the catch lever 89, for a sufficient time to permit the pan to move away from the shock, which has been seated upon the ground, and leaves the shock standing. After the shock has been removed from the pan 51, the weight 107 will swing the pan 51 from a vertical into a horizontal position, after the rod 101 has been again operated, for releasing the bar 95, for movement out of the slot 92. The return movement of the pan, and the re-moving of the rod 101, will rock the tumbler rod, for drawing the prongs 73 out of the interior of the pan 51. The lower head or angled end of the lever 56, has its under edge curved, to permit the bar 57' to ride thereover during the movement of the pan from a vertical to a horizontal position, and the head is of sufficient weight to cause the same to move outwardly beneath the bar 57', when the pan has reached a horizontal position, thereby holding the pan in position for receiving bundles from the car.

The foregoing operation is repeated upon the formation of each shock.

The compression rod 79 has a balancing weight 79' mounted on one of its ends for properly spacing the rod for receiving sheaves in the curved section thereof. The balancing weight 79' tends also to force the compression rods into firm engagement with the tops of the sheaves, while they are being moved into a horizontal position, and they further cause the rod 79 to compress the tops of the sheaves after they have been deposited upon the ground, aiding in properly forming the shocks.

From the foregoing description taken in connection with the accompanying drawings the advantages of construction and of the method of operation of the improved grain shocker will be readily apparent to those skilled in the art to which this invention appertains and, while in the foregoing description, the principle of the operation of this invention has been described together with various features of construction, it is to be understood that certain minor features of construction, combination and arrangement of parts may be altered to suit prac-

What is claimed is:—

1. In a shock forming device, a sheave carrying structure embodying a car structure, a hopper pivotally and hingedly carried by said car structure, and means for tipping said hopper into a delivering position at predetermined times.

2. In a shock forming device, a sheave receiving and shock forming pan, a car structure for carrying sheaves from a binder deck to said pan, said car structure embodying a truck structure, a hopper pivotally and hingedly connected to said truck structure, means controllable by the depositing of a sheave on said car structure for automatically moving the same into a delivering position adjacent to said pan.

3. In a shock forming device, a sheave receiving and shock forming pan, a car structure for carrying sheaves from a binder deck to said pan, said car structure embodying a truck structure, a hopper pivotally and hingedly connected to said truck structure, means controllable by the depositing of a sheave on said car structure for automatically moving the same into a delivering position adjacent to said pan, and means for tipping said hopper for dumping a sheave therefrom when it is positioned adjacent to said pan.

4. In a shock forming device, a sheave receiving and shock forming pan, a car structure for carrying sheaves from a binder deck to said pan, said car structure embodying a truck structure, a hopper pivotally and hingedly connected to said truck structure, means controllable by the depositing of a sheave on said car structure for automatically moving the same into a delivering position adjacent to said pan, means for tipping said hopper for dumping a sheave therefrom when it is positioned adjacent to said pan, said pan being provided with a partition formed therein, and means for regulating the tipping of said hopper for alternately depositing sheaves upon the opposite sides of said divider.

5. In a shock forming device, a supporting frame, a sheave receiving and shock forming pan pivotally carried by said frame, means for holding said pan in a horizontal position while receiving the sheaves, means for releasing said last named means for permitting said pan to move into a vertical position for removal of a shock therefrom, and a plurality of tumbler rods carried by said pan, tines carried by said tumbler rods for insertion through said pan into the sheaves carried thereby for preventing accidental movement of the sheaves during movement of the pan from a horizontal to a vertical position.

6. In a shock forming device, a supporting frame, a sheave receiving and shock forming pan pivotally carried by said frame, means for holding said pan in a horizontal position while receiving the sheaves, means for releasing said last named means for permitting said pan to move into a vertical position for removal of a shock therefrom, a plurality of tumbler rods carried by said pan, tines carried by said tumbler rods for insertion through said pan into the sheaves carried thereby for preventing accidental movement of the sheaves during movement of the pan from a horizontal to a vertical position, restraining means for holding said pan in a vertical position until a shock has been removed therefrom, and means for operating said restraining means for permitting said pan to move into a horizontal position, said tumbler rods being operated for moving said rods out of the sheaves prior to the movement of said pan into a horizontal position.

7. In a shock forming device, a supporting frame, a sheave receiving and shock forming pan pivotally carried by said frame, means for holding said pan in a horizontal position while receiving the sheaves, means for releasing said last named means for permitting said pan to move into a vertical position for removal of a shock therefrom, a plurality of tumbler rods carried by said pan, tines carried by said tumbler rods for insertion through said pan into the sheaves carried thereby for preventing accidental movement of the sheaves during movement of the pan from a horizontal to a vertical position, restraining means for holding said pan in a vertical position until a shock has been removed therefrom, means for operating said restraining means for permitting said pan to move into a horizontal position, said tumbler rods being operated for moving said rods out of the sheaves prior to the movement of said pan into a horizontal position, and compression wires carried by said pan for gripping the tops of sheaves.

8. In a shock forming device, a supporting frame, an inclined track carried by said supporting frame, a sheave receiving and shock forming pan pivotally carried by said frame beyond the upper terminal of said inclined track, a car structure for travel over said track for receiving sheaves from a binder deck and conveying them for deposit into said pan, said car structure embodying a pivotally and hingedly supporting hopper, and means for tipping said hopper when it reaches the upper terminal of said track for dumping the sheaves therefrom into said pan.

9. In a shock forming device, a supporting frame, a receiving pan and shock forming pan carried by said frame, an inclined track carried by said frame and having its upper end positioned adjacent to said pan, a car structure mounted upon said track, said car structure including a pivotally and hingedly supported hopper, means for rotating said hopper when it reaches the upper end of said track, and means for automatically tipping said hopper for dumping a sheave therefrom into said sheave receiving pan.

10. In a shock forming device, a supporting frame, a sheave receiving and shock forming pan carried by said frame, an inclined track carried by said frame and having its upper end positioned adjacent to said pan, a car structure mounted upon said track, said car structure including a pivotally and hingedly supported hopper, means for rotating said hopper when it reaches the upper end of said track, means for automatically tipping said hopper for dumping a sheave therefrom into said sheave receiving pan, and means controllable by the depositing of sheaves in said hopper for automatically moving said car structure upwardly over said track.

11. In a shock forming device, a supporting frame, a sheave receiving and shock forming pan carried by said frame, an inclined track carried by said frame and having its upper end positioned adjacent to said pan, a car structure mounted upon said track, said car structure including a pivotally and hingedly supported hopper, means for rotating said hopper when it reaches the upper end of said track, means for automatically tipping said hopper for dumping a sheave therefrom into said sheave receiving pan, means controllable by the depositing of sheaves in said hopper for automatically moving said car structure upwardly over said track, said pan having a partition formed therein, and means for regulating the position of said car when tipped, for alternately depositing sheaves upon the opposite sides of said divider.

12. In a shock forming device, a supporting frame, a sheave receiving and forming pan pivotally carried by said frame, means for holding said pan in a horizontal position while receiving sheaves, means for releasing said last named means for permitting said pan to move to a vertical position for removal of a shock therefrom, an inclined track carried by said frame and having its upper end terminating adjacent to said pan, a car structure mounted upon said track, a hopper carried by said car structure for receiving sheaves from a binder deck, means controllable by the depositing of a sheave in said hopper for automatically moving said car structure upwardly along said track to a delivering position adjacent to said pan, said hopper being pivotally and hingedly connected to said car structure, means for rotating said hopper for positioning the butt ends of the sheaves outwardly, and means for dumping a sheave from said hopper.

13. In a shock forming device, a supporting frame, a sheave receiving and forming pan pivotally carried by said frame, means for holding said pan in a horizontal position while receiving sheaves, means for releasing said last named means for permitting said pan to move into a vertical position for removal of a shock therefrom, an inclined track carried by said supporting frame, a car structure carried by said inclined track, a hopper pivotally and hingedly connected to said car structure, means controllable by the depositing of a sheave in said hopper for automatically moving said car structure into a delivering position adjacent to said pan, means for rotating said car structure for positioning the butt end of the sheaves outwardly, restraining means for holding said pan in a vertical position until a shock has been removed therefrom, and means for operating said restraining means for permitting said pan to move into a horizontal position.

14. In a shock forming device, a supporting frame, a sheave receiving and forming pan pivotally carried by said frame, means for holding said pan in a horizontal position while receiving sheaves, means for releasing said last named means for permitting said pan to move into a vertical position for removal of a shock therefrom, an inclined track carried by said supporting frame, a car structure carried by said inclined track, a hopper pivotally and hingedly connected to said car structure, means controllable by the depositing of a sheave in said hopper for automatically moving said car structure into a delivering position adjacent to said pan, means for rotating said car structure for positioning the butt end of the sheaves outwardly, restraining means for holding said pan in a vertical position until a shock has been removed therefrom, means for operating said restraining means for permitting said pan to move into a horizontal position, a divider positioned within said pan, and means for controlling the position of said car structure for alternately depositing sheaves therefrom upon the opposite sides of said divider.

15. In a shock forming device, a supporting frame, a sheave receiving and shock forming pan pivotally carried by said frame, means for holding said pan in a horizontal position for receiving sheaves, means for releasing said last named means for permitting said pan to move into a vertical position for removal of a shock therefrom, restraining means for holding the pan in a vertical position until a shock has been removed therefrom, means for operating said restraining means for permitting said pan to move into a horizontal position, an inclined track carried by said supporting frame and having its upper end terminating adjacent to said pan, a car structure carried by said track, a hopper pivotally and hingedly connected to said car structure, means controllable by the depositing of a sheave in said hopper for automatically moving the car structure to the upper end of said inclined track, means for tipping said car structure for dumping a sheave therefrom into said pan, and means for automatically releasing said car operating means upon the dumping of a sheave from said car for permitting of the return of the car to the lower end of said track.

In testimony whereof I affix my signature in presence of two witnesses.

GEORGE A. DURANT.

Witnesses:
MALAN H. DURANT,
ELIZABETH HUNT.